United States Patent
Ko et al.

(10) Patent No.: US 7,782,864 B2
(45) Date of Patent: Aug. 24, 2010

(54) APPARATUS AND METHOD FOR PROVIDING QOS FOR MPLS TRAFFIC

(75) Inventors: Nam Seok Ko, Daejeon (KR); Soo Myung Park, Daejeon (KR); Sung Back Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 456 days.

(21) Appl. No.: 11/543,818

(22) Filed: Oct. 6, 2006

(65) Prior Publication Data

US 2007/0133559 A1     Jun. 14, 2007

(30) Foreign Application Priority Data

Dec. 6, 2005  (KR) ................ 10-2005-0118425
Apr. 20, 2006  (KR) ................ 10-2006-0035865

(51) Int. Cl.
*H04L 12/56* (2006.01)

(52) U.S. Cl. .............. 370/395.21; 370/392; 370/229; 370/395.42

(58) Field of Classification Search ........... 370/395.21, 370/392, 229.252
See application file for complete search history.

(56) References Cited

U.S. PATENT DOCUMENTS 7,266,121 B2 *  9/2007  Raisanen .................... 370/392
7,359,328 B1 *  4/2008  Allan ....................... 370/236.2
2006/0072574 A1 *  4/2006  Akahane et al. ............ 370/392
2006/0176828 A1 *  8/2006  Vasseur et al. ............. 370/252
2007/0127382 A1 *  6/2007  Hussain et al. ............. 370/235
2007/0268823 A1 * 11/2007  Madison et al. ............ 370/229

FOREIGN PATENT DOCUMENTS

| JP | 05-042351 | 6/1994 |
| JP | 06-261078 | 9/1994 |
| JP | 2004-222010 | 8/2004 |
| JP | 2005-020491 | 1/2005 |
| JP | 2005-210606 | 8/2005 |
| KR | 1020050070965 | 7/2005 |
| KR | 1020050082114 | 8/2005 |

OTHER PUBLICATIONS

Office Action dated Jun. 5, 2009, for Japanese application No. 2006-295551.
Office Action dated Sep. 15, 2009, for Japanese application No. 2006-295551, citing the above references.

(Continued)

*Primary Examiner*—Dang T Ton
*Assistant Examiner*—Pamit Kaur
(74) *Attorney, Agent, or Firm*—Lowe Hauptman Ham & Berner LLP

(57) ABSTRACT

An apparatus and a method for providing a QoS for a multi protocol label switching (MPLS) traffic are provided. According to the apparatus and the method, a label and an experimental (EXP) are extracted from an MPLS packet input to an MPLS network system, and then applied to a predetermined hash function to generate at least one hash value. Also, a QoS policy is applied to an MPLS session, and the MPLS packet is forwarded. Therefore, the QoS for transmitting the MPLS packet input to the MPLS network system can be ensured.

9 Claims, 4 Drawing Sheets

OTHER PUBLICATIONS

Hirokazu Takahashi et al. "Design and implementation of Linux kernel 2.4, 12th Network processing (2)", Itsutsubashi Research Co., Ltd, Linux Japan, vol. 4, No. 10, Oct. 1, 2001, pp. 87-97.

Japanese Office Action for Japanese patent application No. 2006-295551, citing the above references.

* cited by examiner

APPARATUS AND METHOD FOR PROVIDING QOS FOR MPLS TRAFFIC

RELATED APPLICATION

The present application is based on, and claims priority from, Korean Application Number 2005-0118425, filed Dec. 6, 2005 and Korean Application Number 2006-0035865, filed Apr. 20, 2006, the disclosure of which is hereby incorporated by reference herein in its entirety.

BACKGROUND OF THE INVENTION

1. Field of the Invention

The present invention relates to an apparatus and a method of providing a Quality of Service (QoS) for a multi protocol label switching (MPLS) traffic.

2. Description of the Related Art

Recently, as the number of Internet subscribers has exponentially increased, the subscribers have demanded various services requiring a QoS with respect to a voice, a moving picture, etc. on the Internet as well as data transmission on a best-effort service, which distinguishes the Internet.

The Internet is a technology suitable to a general data transmission such as a file transmission protocol (FTP) and is mainly based on the Ethernet. An MPLS was developed in order to satisfy the subscribers' demand such as a real time data transmission in the Internet environment.

The MPLS is a protocol between 2 layer and 3 layer of a communication protocol. In the MPLS, a label of 2 layer is recorded in a head of a packet, and data is transmitted in transmitting the packet by using just the label recorded in MPLS header information of the packet. Therefore, the packet can be transmitted to its destination at high speed without operating towards 3 layer. That is, the MPLS classifies a forwarding equivalence class (FEC) using the same destination IP address as a key, based on a forwarding table generated by a general routing protocol, and gives the same label to a routing entry included in the same FEC. Therefore, packets having the same destination have the same label, and thus are transmitted to their destination at high speed by label switching.

In the MPLS, a path is established for transmission and reception, the path is called a label switching path (LSP). The LSP is connection oriented such that the Internet traffic is transmitted in real time. The protocol for the label switching may include a border gateway protocol (BGP) or a label distribution protocol, etc.

An MPLS router located in an MPLS network establishes the LSP using a label included in a shim header for the label switching, and transmits the packet using the label in the MPLS network area. At this point, the MPLS shim header includes 20-bit label field, 30-bit experimental (EXP) field (or a class of service (CoS) field), 1-bit stack field, and 8-bit time to live (TTL) field.

The MPLS router classifies classes by each EXP regardless of the LSP, and provides different QoS to each of the classified classes. That is, the MPLS router classifies the classes by each EXP regardless of the LSP, and provides the QoS to the aggregated traffic of the packets having the same EXP value. In other words, when the packets in different LSPs have the same EXP value, the packets are treated as a same aggregated class, and QoS can be applied only to the aggregated class.

Accordingly, when the packets having the same EXP are received from different LSPs, different QoS cannot be provided to the packets according to each of different LSPs.

SUMMARY OF THE INVENTION

Accordingly, the present invention is directed to a QoS providing apparatus and a method for an MPLS traffic that substantially obviate one or more problems due to limitations and disadvantages of the related art.

An object of the present invention is to provide a QoS providing apparatus and a method for an MPLS traffic which ensure a QoS for the MPLS traffic per each EXP and LSP for packets in an MPLS network using the LSP and the EXP.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method for providing a QoS (quality of service) for an MPLS in an MPLS (multi protocol label switching) network system having a session table for storing information on session generated for each EXP (experimental) in an LSP (label switching path), one or more QoS policy tables for storing QoS policy information which will be applied to the session, and a forwarding table for storing forwarding information of an MPLS packet, the method including: extracting label information and EXP information from the incoming MPLS packet; applying the extracted label information and EXP information to a predetermined hash function to generate at least one hash value; examining whether or not the generated hash value is stored in a session table; and forwarding the MPLS packet according to forwarding information and QoS policy information of the incoming MPLS packet.

When a session which the incoming MPLS packet is included exists in the session table, the forwarding information and the QoS policy information from the matching MPLS session are used to forward the packet.

When a session which the incoming MPLS packet is included does not exists in the session table, the method may further include extracting the QoS policy information from the QoS policy tables and the forwarding information from the forwarding table and generating an entry including the extracted information and adding it to the session table.

The QoS policy tables may be tables which have only EXP or both EXP and LSP as their keys. But there is no limitation for the keys which will be used for QoS policy tables.

The hash function for generating hash value may be a CRC (cyclic redundancy check) 16 algorithm or XOR (exclusive OR) operation in a simple way, but there is no limitation on hash functions for generating hash values. The hash keys which are used for the arguments of the hash function may be one or several MPLS labels, and EXP value which is located on the outermost MPLS label.

According to an aspect of the present invention, there is provided an apparatus for providing a QoS for an MPLS traffic in an MPLS network system comprising a session table whose entries are generated per each EXP (experimental) and LSP (label switching path), more than one QoS policy tables for storing QoS policy information which can be applied to the incoming MPLS packet, and a forwarding table for storing forwarding information of an MPLS packet, the apparatus including: a hash generating unit applying the label information and the EXP information included in the incoming MPLS packet to generate at least one hash value; and a forwarding control unit forwarding the MPLS packet according to the forwarding information and QoS policy information.

When a session which the incoming MPLS packet is part of does not exists in the session table, the forwarding control unit may extract the QoS policy information and the forwarding information corresponding to the incoming MPLS packet from the QoS policy table and the forwarding table, and generate an entry including the extracted information and adds to the session table.

The hash generating unit may generate the hash value for the label information and the EXP information by a hash function such as CRC 16 algorithm or XOR operation. At this point, the hash function could be any available hash functions.

The apparatus may further include: a QoS policy table managing (control) unit generating the QoS policy tables based on various header fields such as EXP and/or label and updating the changed QoS policy information in the QoS policy tables; and a forwarding table managing (control) unit generating the forwarding information from the routing information with the lowest cost of routing information collected while exchanging a routing control protocol message with adjacent routers and storing in the forwarding table, and updating the changed forwarding information in the forwarding table.

The forwarding control unit may include: a session table lookup and generating unit extracting the forwarding information and the QoS policy information for the generated hash value from the forwarding table and the QoS policy tables, and generating an entry including the extracted forwarding information and the QoS policy information of the incoming MPLS packet to add to the session table; a QoS processing unit processing the QoS according to the established QoS policy information to the MPLS packet; and a packet forwarding unit forwarding the MPLS packet according to the established forwarding information. At this point, the session table lookup and generating unit may provide the forwarding information and the QoS policy information of the incoming MPLS packet and accordingly the session which the packet is a part of.

According to another aspect of the present invention, there is provided an apparatus for providing a QoS for an MPLS traffic in an MPLS network system comprising a session table for storing information on session generated for each EXP (experimental) in an LSP (label switching path), QoS policy tables for storing QoS policy information for the incoming MPLS packet, and a forwarding table for storing forwarding information of an MPLS packet, the apparatus including: a hash generating unit applying the label information and the EXP information included in the incoming MPLS packet to generate at least one hash value; a session table lookup and generating unit which create the session entry which the incoming MPLS packet is part of; a QoS processing unit applying the QoS policy information stored in the session table to the MPLS packet; and a packet forwarding unit forwarding the MPLS packet, to which the QoS policy information is applied, according to the stored forwarding information.

When a session which the incoming MPLS packet is part of does not exists in the session table, the session table lookup and generating unit may extract the forwarding information and the QoS policy information of the incoming MPLS packet from the forwarding table and the QoS policy tables, and generate an entry including the extracted information and adds it to the session table.

The hash generating unit may generate the hash value for the label information and the EXP information by a hash function such as CRC 16 algorithm or XOR operation. At this point, the hash function could be any available hash functions.

The apparatus may further include: a QoS policy table managing (control) unit generating the QoS policy table based on various header fields such as EXP and/or label; and a forwarding table managing (control) unit generating the forwarding information from the routing information with the lowest cost of routing information collected while exchanging a routing control protocol message with adjacent routers and storing in the forwarding table, and updating the changed forwarding information in the forwarding table.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
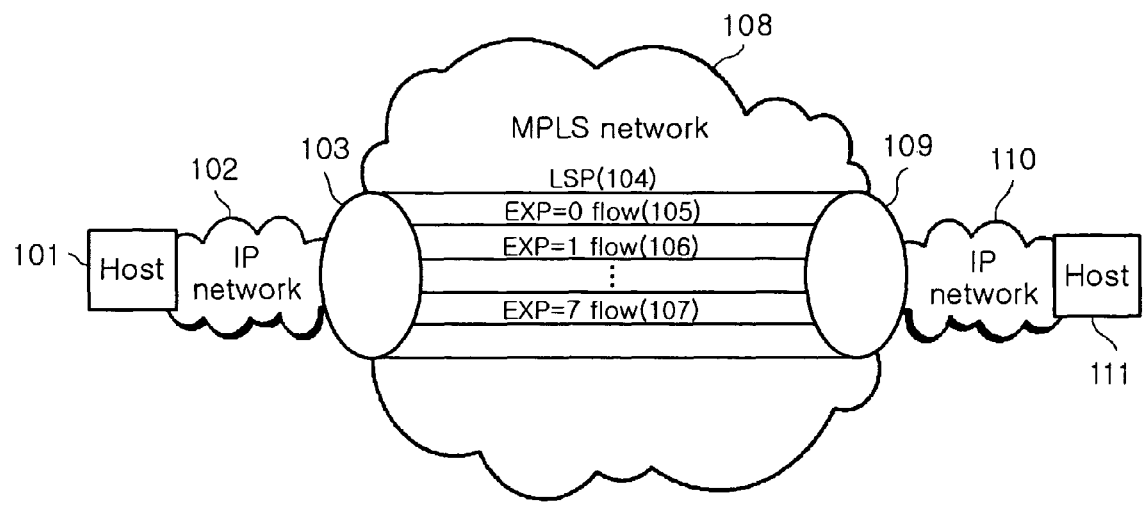
FIG. 1 is an exemplary view illustrating a structure of an MPLS network system to which the present invention is applied.

Reference will now be made in detail to the preferred embodiments of the present invention, examples of which are illustrated in the accompanying drawings. Like reference numerals refer to like or similar elements throughout the drawings.

FIG. 1 is an exemplary view illustrating a structure of a multi protocol label switching (MPLS) network system to which the present invention is applied.

As illustrated in FIG. 1, the MPLS network system includes an MPLS network 108 located between Internet protocol (IP) networks 102 and 110. MPLS routers 103 and 109 located in the MPLS network 108 transmits an MPLS packet to the other IP network through the MPLS network by using label information and experimental (EXP) information included a shim header of the MPLS packet received from hosts 101 and 111 located in the IP networks 102 and 110. At this point, the MPLS routers 103 and 109 process the MPLS packet received from the hosts 101 and 111 located in the IP networks 102 and 110 through a label switching path (LSP) 104. A session is generated for each of eight EXPs 105, 106, ..., 107 in the LSP 104 between the MPLS routers 103 and 109. In other words, the MPLS routers located in the MPLS network 108 generate the session therebetween based on the label information and the EXP information included in the incoming MPLS packet, and process the MPLS packet according to a QoS policy established for the session for each EXP in the LSP therebetween.

Figure 2:
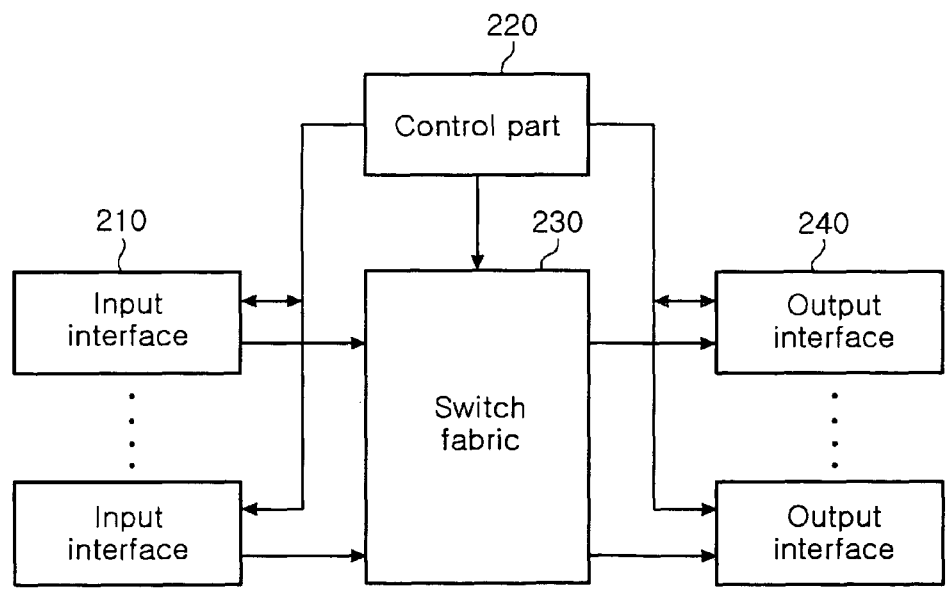
FIG. 2 is a block diagram illustrating a structure of an MPLS router illustrated in FIG. 1.

FIG. 2 is a block diagram illustrating a structure of the MPLS router illustrated in FIG. 1.

Referring to FIG. 2, each of the MPLS routers 103 and 109 according to the present invention includes a plurality of input interfaces 210, a control part 220, a switch fabric 230, and a plurality of output interfaces 240. The input interface 210 provides the MPLS packet input from the IP networks 102 and 110 to the switch fabric 230. The control part 220 controls the switch fabric 230 to connect the MPLS packet input from the input interface 210 to the output interface 240. The switch fabric 230 switches in response to a control signal of the control part 220 to provide the output interface 240 with the MPLS packet input to the input interface 210. The output interface 240 outputs the MPLS packet provided from the switch fabric 230.

Figure 3:
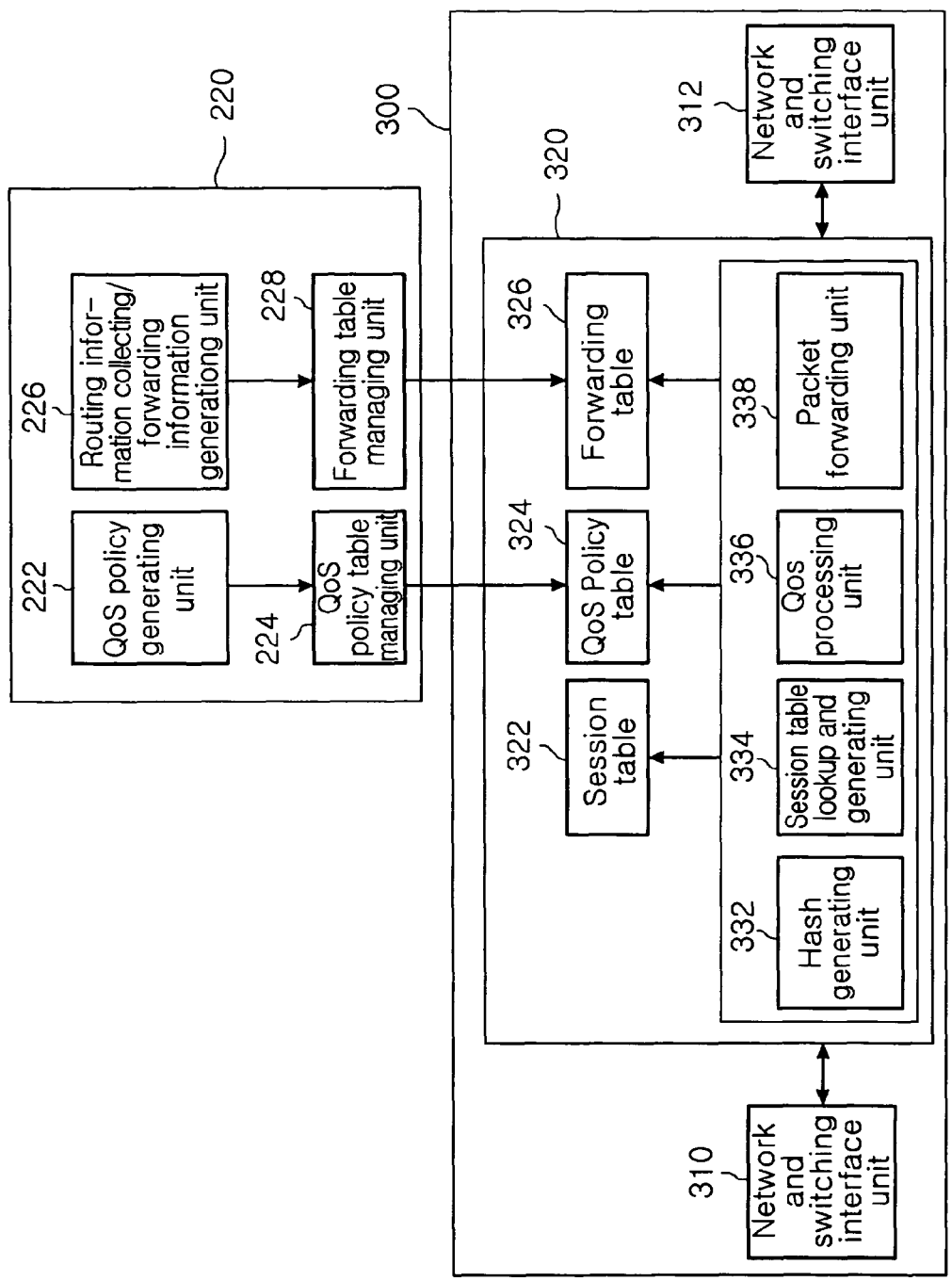
FIG. 3 is a block diagram illustrating a structure of an apparatus for providing a QoS for an MPLS traffic according to an embodiment of the present invention.

FIG. 3 is a block diagram illustrating a structure of an apparatus for providing a QoS for an MPLS traffic according to an embodiment of the present invention.

Referring to FIG. 3, the apparatus for providing a QoS for an MPLS traffic according to the present invention largely includes the control part 220, a QoS control part 320, and network and switching interface parts 310 and 312.

The control part 220 includes a QoS policy generating unit 222, a QoS policy table managing unit 224, a routing information collecting/forwarding information generating unit 226, and a forwarding table managing unit 228.

The QoS policy generating unit 222 provides QoS policy information from a network manager (not shown) to the QoS policy table managing unit 224. The QoS policy table managing unit 224 stores the QoS policy information provided from the QoS policy generating unit 222 in a QoS policy table 324, and updates the changed QoS policy information in the QoS policy table 324.

The routing information collecting/forwarding information generating unit 226 collects routing information while exchanging a routing protocol control message with routers, and generates forwarding information from the routing information with the lowest cost of the collected routing information to provide the forwarding information to the forwarding table managing unit 228.

The forwarding table managing unit 228 stores the forwarding information provided from the routing information collecting/forwarding information generating unit 226 in the forwarding table 326, and updates the changed forwarding information in the forwarding table 326.

Meanwhile, each of the input interface 210 and the output interface 240 of the MPLS router is called as its name depending on whether it transmit packets or receive packets to and from the networks. If an interface receives the MPLS packet from the MPLS network or IP packets from IP networks, the interface can be called input interface, on the other hand, if it transmits the MPLS packet to the MPLS network or IP packet to the IP network, it is called output interface. In other words, all input interfaces 210 and output interfaces 240 illustrated in FIG. 2 may receive the IP or MPLS packet from the IP or MPLS network or transmit the IP or MPLS packet to the IP or MPLS network. Therefore, the input interface 210 and the output interface 240 have the same structure as an interface 300 illustrated in FIG. 3.

The interface 300 illustrated in FIG. 3 includes the network and switching interface parts 310 and 312 and the QoS control part 320. The network and switching interface parts 310 and 312 extract the label and the EXP from the incoming MPLS packet to provide to the QoS control part 320. The QoS control part 320 includes a session table 322, the QoS policy tables 324, the forwarding table 326, and a session processing part 330.

The session table 322 stores session information generated for each EXP in at least one LSP, the QoS policy tables 324 store QoS policy information which will be applied to the sessions generated for each EXP in at least one LSP, and the forwarding table 326 stores forwarding information necessary for forwarding of the incoming MPLS packet.

Also, the session processing part 330 includes a hash generating unit 332, a session table lookup and generating unit 334, a QoS processing unit 336, and a packet forwarding unit 338. The hash generating unit 332 performs a hash function established for the label and the EXP included in the MPLS packet provided from the network and switching interface parts 310 and 312 to generate a hash value for the EXP for each label included in the MPLS packet. The session table lookup and generating unit 334 creates the session entries based on the hash value generated from the hash generating unit 332, and stores in the session table 322 and updates the changed session information in the session table 322. The QoS processing unit 336 applies the QoS policy information to the incoming MPLS packet. The packet forwarding unit 338 processes forwarding and scheduling of the incoming MPLS packet according to the forwarding and QoS information.

Figure 4:
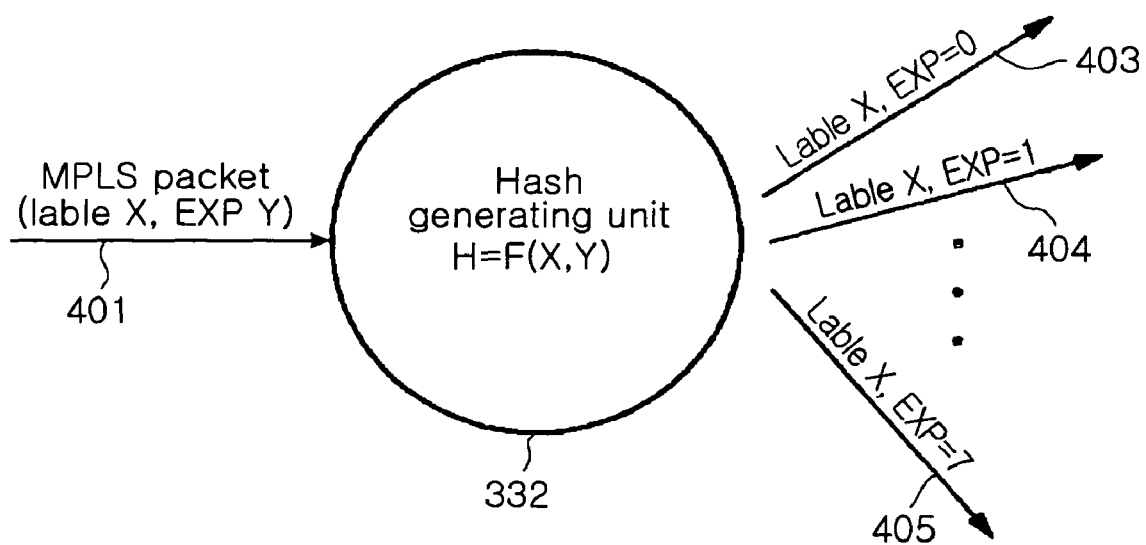
FIG. 4 is a conceptual diagram illustrating a generating process of a hash value for each EXP for a label included in an MPLS packet according to the present invention.

FIG. 4 is a conceptual diagram illustrating a generating process of the hash value for each EXP for the label included in the MPLS packet according to the present invention.

Referring to FIG. 4, the hash generating unit 332 applies a label X and an EXP Y included in the incoming MPLS packet 401 to a hash function (H=F(X,Y)) to generate hash values 403, 404 and 405 for each EXP for the label X. At this point, the hash values 403, 404 and 405 for each EXP for the label X may be generated by a cyclic redundancy check (CRC) 16 algorithm or by an exclusive OR (XOR) operation for the label X and the EXP Y applied to the hash function.

Figure 5:
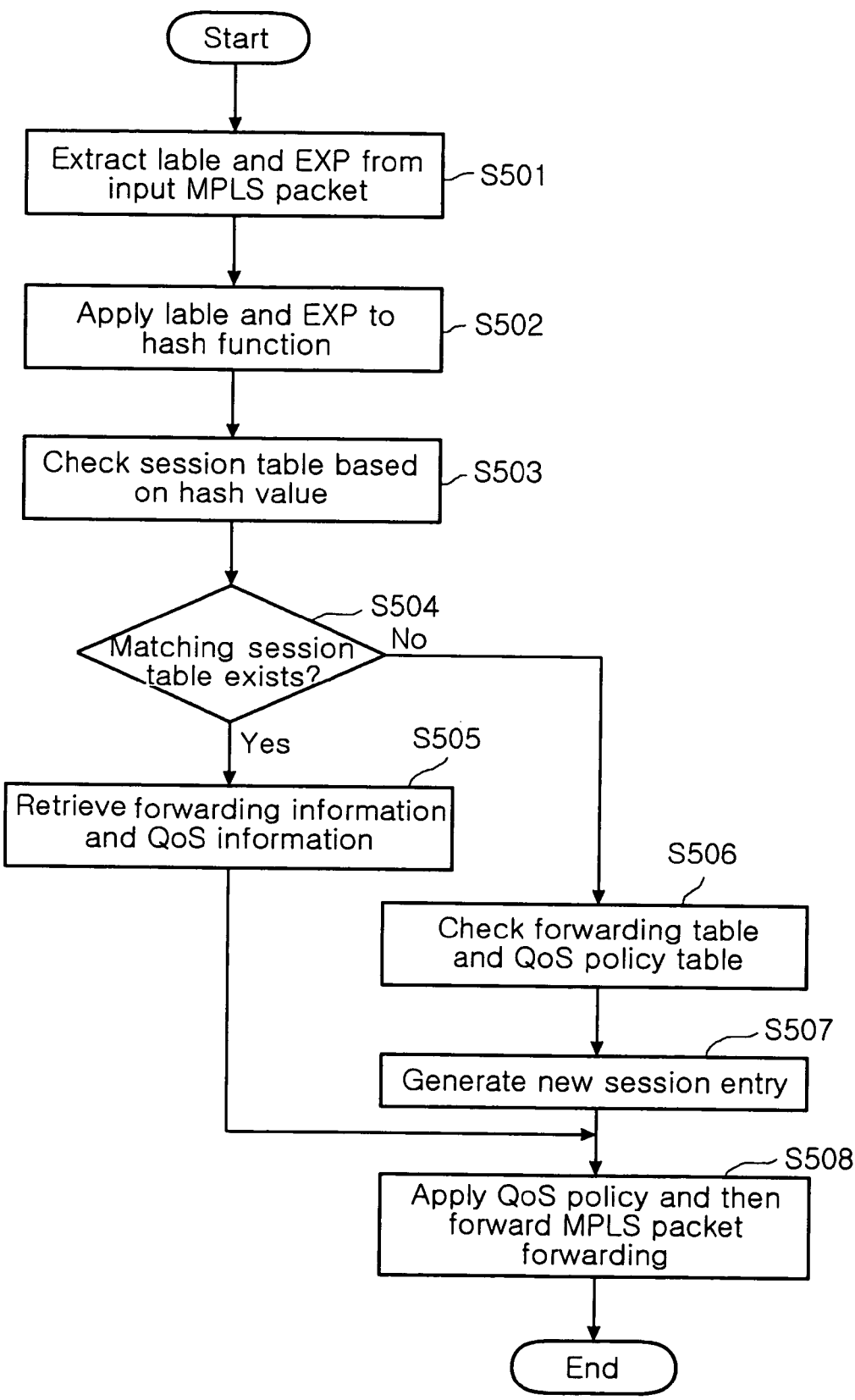
FIG. 5 is a flowchart illustrating a method for providing a QoS for an MPLS traffic according to an embodiment of the present invention.

FIG. 5 is a flowchart illustrating a method for providing a QoS for an MPLS traffic according to an embodiment of the present invention.

As illustrated in FIG. 5, according to the method for providing the QoS for the traffic in an MPLS network system, label information and experimental (EXP) information are extracted from an MPLS packet input from an IP network (S501). Step S501 may be performed in the network and switching interface parts 310 and 312 illustrated in FIG. 3. Next, the extracted label information and EXP information are applied to a predetermined hash function to generate at least one hash value (S502). Step S502 may be performed in the hash generating unit 332 in illustrated in FIG. 3.

A session table is examined based on the generated hash value (S503), and it is examined whether the hash keys are stored in the session table to decide whether the matching session table exists or not (S504). Steps S503 and S504 may be performed in the session table lookup and generating unit 334 illustrated in FIG. 3. The session table is identical with the session table 322 illustrated in FIG. 3. At this point, the hash keys may have the same values in the session table. Therefore, when the session table is examined based on the hash keys, the session table is preferably examined using the label information and the EXP information in the MPLS packet as key values.

Next, when a matched session entry exists, forwarding and QoS information corresponding in the session table is retrieved (S505). Step S505 may be performed in the session table lookup and generating unit 334 illustrated in FIG. 3.

A QoS policy is applied for the MPLS packet and the MPLS packet is forwarded according to the retrieved forwarding and QoS information (S508). Step S508 may be performed in the packet forwarding unit 338 and the QoS processing unit 336.

On the other hand, when a matched session entry does not exist, QoS policy tables and a forwarding table are looked up to find QoS policy information and forwarding information (S506). Next, a new session entry, in which hash keys, the extracted QoS policy information and forwarding information are stored, is generated and added to the session table (S507). Steps S506 and S507 may be performed in the session table lookup and generating unit 334 illustrated in FIG. 3.

Next, the QoS policy information included in the generated session entry is applied, and then the MPLS packet is forwarded according to the forwarding information (S508).

As described above, according to the apparatus and the method for providing the QoS for the MPLS traffic of the present invention, the QoS for transmitting the MPLS packet for each EXP for the LSP can be ensured for the packets in the MPLS network by using the LSP and the EXP.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for providing a QoS (quality of service) for an MPLS in an MPLS (multi protocol label switching) network system comprising a session table for storing information on session generated for each EXP (experimental) in an LSP (label switching path), more than one QoS policy tables for storing QoS policy information which will be applied to the session, and a forwarding table for storing forwarding information of an MPLS packet, the method comprising:
   extracting label information and EXP information from an incoming MPLS packet;
   applying the extracted label information and EXP information to a predetermined hash function to generate at least one hash value;
   examining whether a matching session entry exists or not in a session table;
   generating QoS policy tables and updating the QoS policy information in the QoS policy tables;
   forwarding the MPLS packet according to the forwarding information and QoS policy information corresponding to an MPLS session when the matching session entry exists in the session table; and
   extracting the QoS policy information and the forwarding information from the QoS policy tables and the forwarding table, and generating an entry including the extracted information and adding to the session table when a matching session entry does not exist in the session table.

2. The method of claim 1, further comprising:
   forwarding the MPLS packet according to the forwarding information and the QoS policy information corresponding to the MPLS session stored in the session table when the matching session entry exists in the session table.

3. The method of claim 1, wherein the hash value is generated for the label information and the EXP information by a hash function such as CRC (cyclic redundancy check) 16 algorithm or XOR (exclusive OR) operation.

4. An apparatus for providing a QoS for an MPLS traffic in an MPLS network system comprising a session table for storing information on session generated for each EXP (experimental) in an LSP (label switching path), more than one QoS policy tables for storing QoS policy information for the session, and a forwarding table for storing forwarding information of an MPLS packet, the apparatus comprising:
   a hash generating unit applying the label information and the EXP information included in an incoming MPLS packet to generate at least one hash value;
   a forwarding control unit configured to forward the MPLS packet according to the forwarding information and QoS policy information retrieved from a session entry when the session entry matches the at least one generated hash value, and forward the MPLS packet according to the forwarding table and QoS policy tables when a matching session entry does not exist;
   a QoS policy table managing (control) unit generating the QoS policy tables based on header fields including at least one of the EXP and label information, and updating the QoS information in the QoS policy tables; and
   a forwarding table managing (control) unit configured to generate the forwarding information from routing information with the lowest cost collected while exchanging a routing control protocol message with adjacent routers, and storing and updating the forwarding information in the forwarding table;
   wherein the forwarding control unit is further configured to generates an entry including the extracted information and add the entry to the session table when a matching session entry does not exist.

5. The apparatus of claim 4, wherein the hash generating unit generates the hash value for the label information and the EXP information by a hash function such as CRC 16 algorithm or XOR operation.

6. The apparatus of claim 4, wherein the forwarding control unit comprises:
   a session table lookup and generating unit configured to extract the forwarding information and the QoS policy information from the forwarding table and the QoS policy tables, and generate a session table entry that includes the extracted forwarding information and the QoS policy information corresponding to the generated hash value;
   a QoS processing unit processing the QoS according to established QoS policy information to the MPLS packet; and
   a packet forwarding unit forwarding the MPLS packet according to established forwarding information.

7. The apparatus of claim 6, wherein the session table lookup and generating unit provides the forwarding information and the QoS policy information in the session table, when the corresponding entry is generated in the session table.

8. An apparatus for providing a QoS for an MPLS traffic in an MPLS network system comprising a session table for storing information on session generated for each EXP (experimental) in an LSP (label switching path), more than one QoS policy table for storing QoS policy information for the session, and a forwarding table for storing forwarding information of an MPLS packet, the apparatus comprising:
   a hash generating unit applying the label information and the EXP information included in an incoming MPLS packet to generate at least one hash value;
   a session table lookup and generating unit, when a matching session entry exists in the session table, retrieving the forwarding information and the QoS policy information in the session table;

a QoS processing unit applying the QoS policy information which is set in the session table to the MPLS packet;

a packet forwarding unit forwarding the MPLS packet, to which the QoS policy information is applied, according to the forwarding information which is retrieved from the forwarding table;

a QoS policy table managing (control) unit generating the QoS policy tables based on various header fields such as EXP and/or label and updating the QoS policy information in the QoS policy tables; and a forwarding table managing (control) unit generating the forwarding information from routing information with the lowest cost collected while exchanging a routing control protocol message with adjacent routers, and storing and updating the forwarding information in the forwarding table;

wherein when a matching session entry does not exist in the session table, the session table lookup and generating unit extracts the forwarding information and the QoS policy information from the forwarding table and the QoS policy tables, and generates an entry including the extracted information and adds it to the session table.

9. The apparatus of claim 8, wherein the hash generating unit generates the hash value for the label information and the EXP information by a hash function such as CRC 16 algorithm or XOR operation.

* * * * *